United States Patent
Mercier

Patent Number: 5,790,231
Date of Patent: Aug. 4, 1998

[54] ASPHERICAL CONTACT LENS FOR CORRECTING PRESBYOPIA

[75] Inventor: Jean-Louis Mercier, Fontenay-les-Briis, France

[73] Assignee: Cabinet Bonnet-Thirion, Paris, France

[21] Appl. No.: 789,546

[22] Filed: Nov. 8, 1991

Related U.S. Application Data

[63] Continuation of Ser. No. 197,846, May 24, 1988.

[30] Foreign Application Priority Data

Jun. 1, 1987 [FR] France .................... 87 07627

[51] Int. Cl.$^6$ .................................. G02C 7/04
[52] U.S. Cl. ................................... 351/161
[58] Field of Search .................. 351/160 R, 160 H, 351/161, 162

[56] References Cited

U.S. PATENT DOCUMENTS 4,580,882  4/1986  Nuchman et al. ............ 351/177 X
4,640,595  2/1987  Volk .............................. 351/161

FOREIGN PATENT DOCUMENTS

| 986343 | 3/1976 | Canada. |
|---|---|---|
| 0184490 | 6/1986 | European Pat. Off. . |
| 2340560 | 9/1977 | France . |
| 2582416 | 11/1986 | France . |
| 2033101 | 5/1980 | United Kingdom . |

*Primary Examiner*—Scott J. Sugarman
*Attorney, Agent, or Firm*—Longacre & White

[57] ABSTRACT

A contact lens has a spherical surface (the rear surface, for example) and an aspherical surface (in this case, the front surface). The caustic curve of the wave surface which emerges from the contact lens comprises two cusps, one of which is paraxial and the other of which is marginal. The lens has applications in the correction of presbyopia.

30 Claims, 2 Drawing Sheets

ASPHERICAL CONTACT LENS FOR CORRECTING PRESBYOPIA

This is a continuation of application Ser. No. 07/197,846, filed May 24, 1988, which was abandoned upon the filing hereof.

BACKGROUND OF THE INVENTION

Field of the invention

The present invention concerns contact lenses for correcting presbyopia, that in contact lenses for compensating for defective crystalline lens accommodation.

A contact lens of this kind must enable both distance vision and near vision, of course.

The present invention is more particularly directed towards the case where these two vision types are said to be "simultaneous" over the functional, that is central, portion of the lens having a diameter substantially equal to that of the pupil of the eye.

The most common practical example is where the contact lens is a bifocal lens comprising two concentric areas, one for distance vision and one for near vision, and only rays passing through the area in question participate in forming the image of the observed object.

The same occurs with a progressive contact lens, that is a contact lens wherein at least one of the surfaces is aspherical, at least over its functional portion, while its other surface is usually spherical, at least over its functional portion.

One of the advantages of simultaneous vision type contact lenses lies in the fact that they must be only slightly movable on the eye.

If is far easier to limit the mobility of a contact lens than to control its movement perfectly within a defined range of movement.

Difficulties usually due to such mobility, necessitating close control thereof even though this would vary from person to person, are therefore minimized.

Currently, however, simultaneous vision tyde contact lenses are themselves subject to problems which prevent a significant degree of wearer satisfaction from being achieved.

The main reason for this is that an overall reduction in acuity is frequently observed with them, particularly with near vision, when ambient lighting conditions are insufficient. This reduction is acuity may be accompanied by reduction in contrast and/or the appearance of stray reflections.

It must be born in mind that, on reducing the level of illumination, the pupil dilates whereas when the eye accommodates, or converges, as for near vision, its diameter reduces.

The combined effect of these two opposing phenomena, which happen at any age but may vary from one individual to another, means that concentric type bifocal lenses in particular are poorly adapted for achieving sufficient acuity permanently, that is under all conditions. Consequently they are poorly adapted for correct vision, especially for near vision, because their optical areas for distance and for near vision have well defined and well separated extents.

The same type problems are also currently to be found with progressive contact lenses comprising an aspherical surface.

This is the case, for example, with the contact lens described in European patent application No. 184 490 which comprises an aspherical surface having a singular point on its axis.

Trials conducted with a contact lens of this kind resulted in a degree of wearer satisfaction of less than 33%, which is clearly inadequate.

A general object of the present invention is to provide a simultaneous vision type contact lens which can produce an adequate degree of wearer satisfaction.

The invention is based on the fact that, in the presence of spherical aberration in the optical object presented to it, the human visual system constituted by the eye and the contact lens applied thereto spontaneously places its image analysis plane at the cusp of the caustic curve of the corresponding wave surface.

The invention is also based on the fact that, starting from a given caustic curve, it is possible to work back to the polynomial expression for the appropriate aspherical surface using an appropriate calculation method and a desired optimization mode of the caustic curve.

SUMMARY OF THE INVENTION

The invention consists in a contact lens wherein one surface is spherical at least over its functional portion while the other is aspherical at least over its functional portion and wherein the caustic curve of the wave surface emergent therefrom comprises two cusps, one paraxial and the other marginal.

Experiment has shown, and this discovery is the basis of the invention, that by conferring on the spherical aberration of the human optical visual system constituted by the eye and the contact lens applied thereto the specific property of having two cusps on the corresponding caustic curve, it is advantageously possible to solve satisfactorily problems usually encountered with current simultaneous vision type contact lenses.

In particular, this contact lens utilizes, both for an object placed at a finite distance and for an object placed at an infinite distance, those light rays which, with bifocal contact lenses having concentric near and distance vision areas, would not participate in forming the useful image of such an object perceived by the subject.

The problems of variations in pupil diameter can therefore be overcome to an acceptable degree, which is advantageous.

Characteristics and advantages of the invention will be made clear in the following description given by way of example with reference to the appended schematic drawings.

DESCRIPTION OF THE PREFERRED EMBODIMENTS

Figure 1:
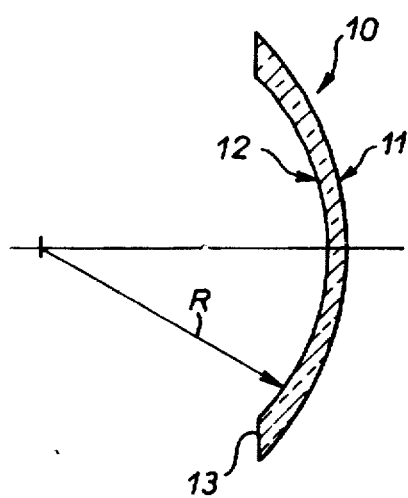
FIG. 1 is an axial cross-section through a contact lens according to the invention.

As shown in FIG. 1, a contact lens according to the invention comprises a convex front surface 11 and a concave rear surface 12 with, optionally, and as shown here, a connecting area 13 formed at the periphery of the surfaces from one or more concentric annular surfaces joining the one to the other.

One of the surfaces of the contact lenses 10, in this embodiment the rear surface 12, is a spherical surface of radius R, at least over its functional portion. The other surface, in this embodiment the front surface 11, is an aspherical surface, at least over its functional portion.

Figure 2:
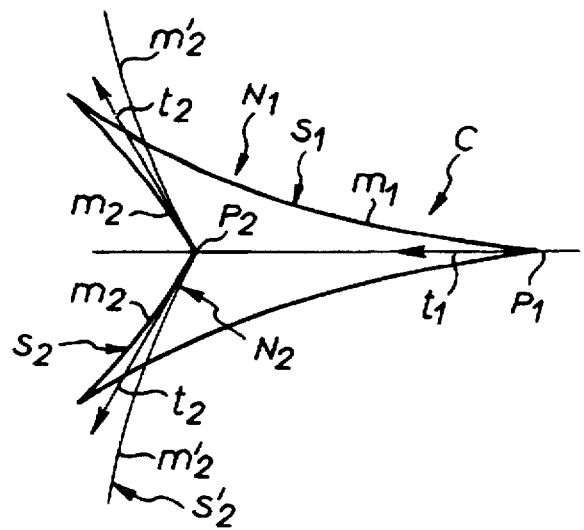
FIG. 2 shows the caustic curve of the wave surface.

According to the invention and as shown in FIG. 2, a parallel or collimated light beam incident the lens 10 emerges as a caustic curve C. The caustic curve C of the wave surface which emerges from the inventive contact lens 10 comprises two cusps $P_1$, $P_2$, one paraxial and the other marginal.

The caustic curve of an optical system is the envelope of light rays that have passed through it.

In this case the caustic curve C of the inventive contact lens 10 is formed by two nappes $N_1$, $N_2$ respectively containing the two cusps $P_1$, $P_2$.

The cusps $P_1$ and $P_2$ are respectively points of inflection for nappes $N_1$ and $N_2$ and each is situated on the axis of the caustic curve.

As shown in FIG. 2, nappe $N_1$ is formed by a single surface $S_1$ with meridian $m_1$ tangential at $P_1$ to the axis of the caustic surface (tangent $t_1$) whereas nappe $N_2$ is formed by two surfaces $S_2$, $S'_2$ whose meridians $m_2$, $m'_2$ have a common tangent $t_2$ at $P_2$ oblique to said axis, each diverging from a respective side of this tangent $t_2$.

Put another way, for cusp $P_1$ tangent $t_1$ to meridian $m_1$ of surface $S_1$ constituting nappe $N_1$ is coincident with the axis of the caustic curve and for cusp $P_2$ tangent $t_2$ to meridians $m_2$, $m'_2$ of surfaces $S_2$, $S'_2$ constituting the two branches of nappe $N_2$ is inclined to this axis.

Note that these cusps $P_1$ and $P_2$ are directed in the same axial sense.

The distance between cusps $P_1$ and $P_2$ is directly linked to the desired power sum of the lens.

With a caustic curve C of this kind, it is possible, taking into account optimization of parameters to be complied with and selected to achieve the desired results, to compute the polynomial expression describing the aspherical surface which must form the convex front surface 11 of this embodiment of contact lens 10.

Figure 3:
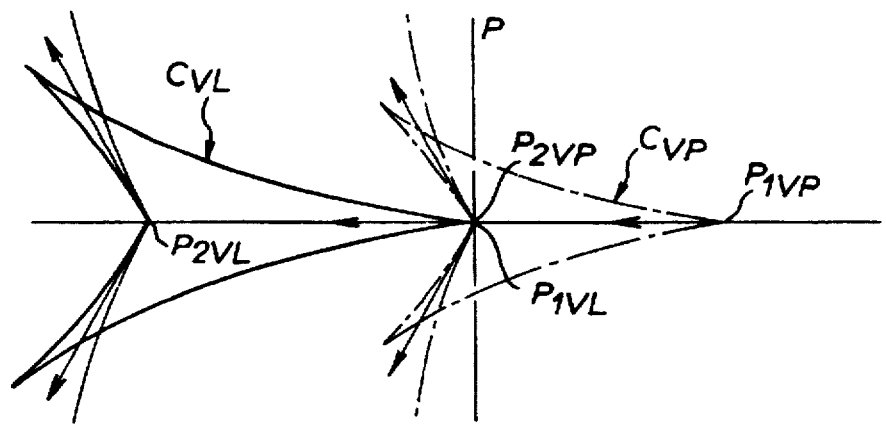
FIG. 3 shows two caustic curves for this contact lens, one corresponding to an object situated at infinity and the other corresponding to an object situated at a finite distance.

Preferably, and as shown in FIG. 3, the arrangement is such that, in an analysis plane P, corresponding to an individual's ponctum remotum, the paraxial cusp $P_{1VL}$ of caustic curve $C_{VL}$ of the wave surface which images a point situated at infinity is coincident with the marginal cusp $P_{2VP}$ of caustic curve $C_{VP}$ of the wave surface which images an object situated at a finite distance, that is at a selected finite distance with is directly linked to the desired power sum.

In FIG. 3, the caustic curve $C_{VL}$ is shown in full line and the caustic curve $C_{VP}$ is shown in dashed line.

As is well known, a cusp on a caustic curve corresponds to a maximum concentration of light and the eye, in the presence of an aberration, focuses preferentially on this maximum light concentration.

Since the resolving power of the eye is, on average, 1'30, it is sufficient for images of two objects to be separated by an angle larger than this in order to be satisfactorily distinguished and thus to obtain a clear overall image of these objects.

Placing two cusps on caustic curves in the same analysis plane, one of which corresponds to near vision and the other of which corresponds to distance vision, means that the images are sufficiently clear to enable them to be correctly observed, which is advantageous.

Figure 4A:
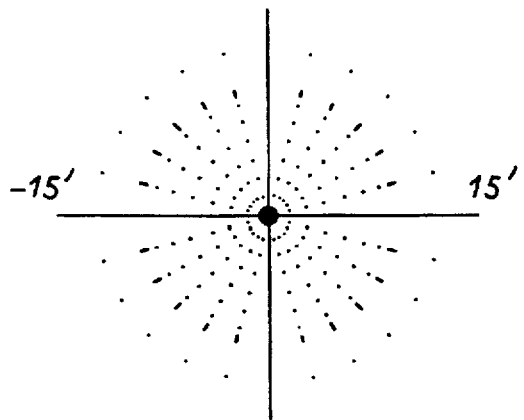
FIG. 4A shows the images of a point situated at infinity in the analysis plane of an eye fitted with a contact lens of this kind.
Figure 4B:
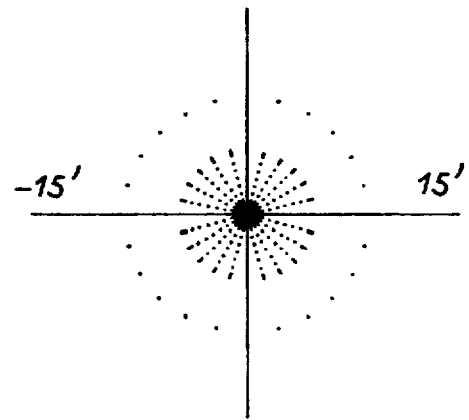
FIG. 4B is analogous to FIG. 4A, but for a point situated at a finite distance.

FIGS. 4A, 4B show this result, the coordinates being minutes of angle.

FIG. 4A shows the images for a point situated at infinity.

FIG. 4B shows those for a point situated at a distance of 500 mm.

Note the high concentration of light in the central area in both cases, shown as a relatively small black spot.

In the first embodiment shown in FIG. 1 the inventive contact lens 10 has an aspherical front surface 11 whose radius of curvature is larger at the centre than at the edge.

Figure 5:
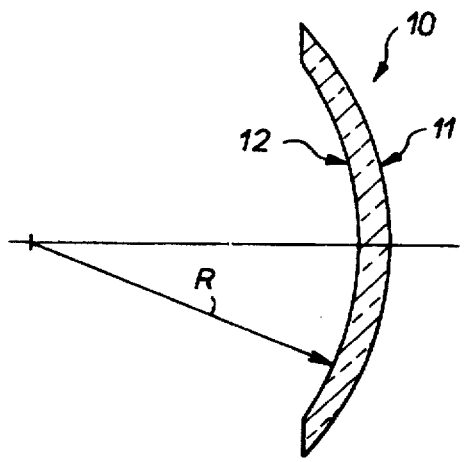
FIGS. 5, 6, 7, 8A and 8B are respectively analogous to FIGS. 1, 2, 3, 4A and 4B for another contact lens according to the invention.
Figure 6:
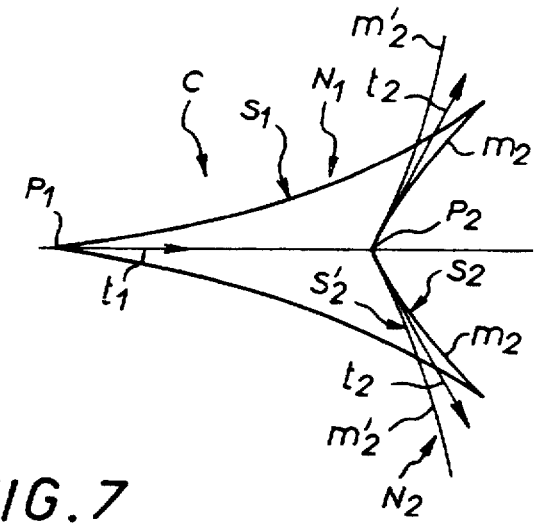

FIG. 5 shows a second embodiment of the contact lens 10 wherein the aspherical front surface 11 has a radius of curvature which is smaller in the centre that at the edge.

In this case the caustic curve C is reversed relative to the previous curve.

However, as before the caustic curve has two axial cusps $P_1$ and $P_2$, one paraxial and the other marginal, both directed in the same axial sense.

Figure 7:
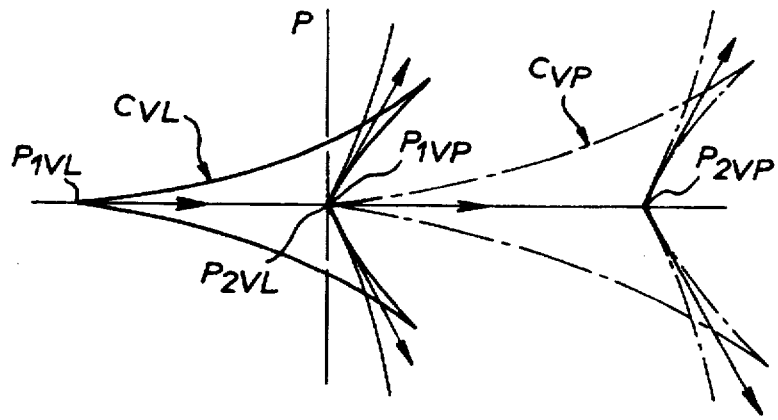

Preferably, and as shown in FIG. 7, the arrangement is such that the paraxial cusp $P_{1VP}$ of caustic curve $C_{VP}$ which images an object situated at a finite distance is coincident with the marginal cusp $P_{2VL}$ of the caustic curve $C_{VL}$ which images an object situated at infinity.

Figure 8A:
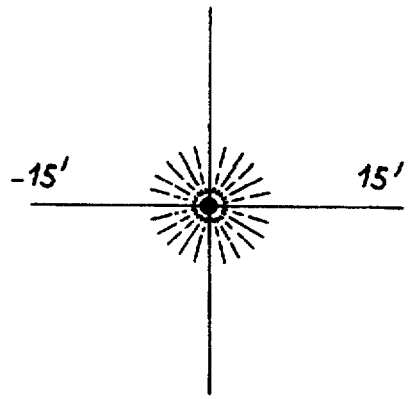
Figure 8B:
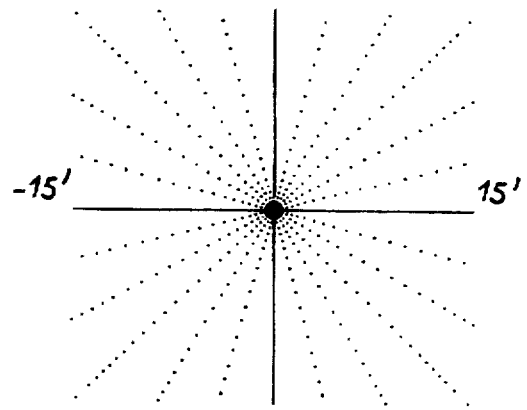

FIGS. 8A and 8B show the respective images for a point situated at infinity and a point situated at 500 mm.

By way of illustration, numerical values are given below for each of these two examples.

EXAMPLE 1

| | | |
|---|---|---|
| Power, distance vision | −7.00 | } sum: 2.00 |
| Power, near vision | −5.00 | |
| Useful diameter of aspherical surface | 4 mm | |
| Radius of convex aspherical front surface | 9.0274 mm = R | |
| Radius of concave spherical rear surface | 8 mm | |
| Index | 1.38 | |
| Thickness at centre | 0.2 mm | |
| Equation of front surface where the x-axis is the optical axis, and the y-axis is the meridional axis: | | |

$$X = \frac{Y^2}{R\left[1 + \sqrt{1 - (K_1 + 1)\frac{Y^2}{R^2}}\right]} + K_2 Y^4 + K_3 Y^6 + K_4 Y^8 + K_5 Y^{10}$$

where
$K_1 = -1.49421$
$K_2 = -0.193 \times 10^{-2}$
$K_3 = 0.499 \times 10^{-2}$
$K_4 = -0.254 \times 10^{-2}$
$K_5 = 0.415 \times 10^{-3}$

EXAMPLE 2

| | |
|---|---|
| Power, distance vision | +4.00 ⎫ sum: 1.50 |
| Power, near vision | +5.50 ⎭ |
| Useful diameter of aspherical surface | 6 mm |
| Radius of convex aspherical front surface | 7.7579 mm = R |
| Radius of concave spherical rear surface | 8.6 mm |
| Index | 1.44 |
| Thickness | 0.15 mm |

Equation of front surface
where the x-axis is the optical axis,
and the y-axis is the meridional axis:

$$X = \frac{Y^2}{R\left[1 + \sqrt{1 - (K_1 + 1)\frac{Y^2}{R^2}}\right]} + K_2 Y^4 + K_3 Y^6 + K_4 Y^8 + K_5 Y^{10}$$

where
$K_1 = -1$
$K_2 = -0.1135 \times 10^{-3}$
$K_3 = 0.1501 \times 10^{-5}$
$K_4 = -0.4215 \times 10^{-5}$
$K_5 = 0.2501 \times 10^{-6}$ The present invention is, of course, not limited by these numerical values.

More generally, it is not limited to the embodiments described and shown.

In particular, the aspherical surface of a contact lens according to the invention may be either the concave rear surface or the convex front surface.

In all cases the diameter of the functional portion of this aspherical surface is preferably at least 4 mm.

Finally, although in the foregoing and particularly in the specifically described examples, the geometry of the aspherical surface of the contact lenses concerned is determined by a polynomial, obviously a "pistol" curve function (spline) could be used.

I claim:

1. A contact lens comprising two surfaces, each of the two surfaces having a functional portion, at least the functional portion of one of the surfaces being spherical and at least the functional portion of the other of the surfaces being aspherical, the aspherical surface having a profile determined by a caustic curve of a wave surface emergent from the contact lens and corresponding to a collimated incident light beam, said caustic curve comprising two cusps, one of the cusps being paraxial and the other being marginal, and the cusps of the caustic curve both being directed in the same axial direction.

2. A contact lens according to claim 1 wherein the distance between said cusps of said caustic curve is directly linked to the power sum of the lens.

3. A contact lens according to claim 1 wherein said caustic curve is formed by two nappes each containing a respective cusp.

4. A contact lens according to claim 3 wherein said cusps form respective points of inflection for the nappes of said caustic curve.

5. A contact lens according to claim 4 wherein the first nappe of the caustic curve is formed by a single surface the meridian of which is tangential to the axis of the caustic curve and wherein the second nappe is formed by two surfaces the meridians of which have a comon tangent which is oblique to said axis.

6. A contact lens according to claim 1 wherein the paraxial cusp of the caustic curve of the wave surface which images an object situated at infinity is coincident with the marginal cusp of the caustic curve of the wave surface which images an object situated at a finite distance.

7. A contact lens according to claim 1 wherein the paraxial cusp of the caustic curve of the wave surface which images an object situated at a finite distance is coincident with the marginal cusp of the caustic curve of the wave surface which images an object situated at infinity.

8. A contact lens according to claim 1 wherein the convex front surface thereof is said aspherical surface.

9. A contact lens according to claim 1 wherein the concave rear surface thereof is said aspherical surface.

10. A contact lens according to claim 1 wherein the diameter of the functional portion of said other, aspherical surface is at least 4 mm.

11. A contact lens according to claim 1 wherein said surfaces are surfaces of revolution.

12. A contact lens according to claim 1, wherein the contact lens has a convex front surface, the aspherical surface being said front surface.

13. A contact lens according to claim 1, wherein the contact lens has a concave rear surface, the aspherical surface being said rear surface.

14. A contact lens according to claim 1 wherein said profile is formed so as to create said caustic curve.

15. A contact lens according to claim 1 wherein said aspherical surface comprises a center, an edge and a radius of curvature, said radius of curvature being larger at said center than at said edge.

16. A contact lens according to claim 1 wherein said aspherical surface comprises a center, an edge and a radius of curvature, said radius of curvature being larger at said edge than at said center.

17. A contact lens according to claim 1 wherein said caustic curve is selected on the basis of a desired combination of lens performance criteria relating to distance vision power correction, near vision power correction, diameter of said aspherical surface, radius of said aspherical surface, radius of said spherical surface, index of lens material, and the thickness at the center of the lens.

18. A contact lens according to claim 17 wherein said aspherical surface is characterized by the equation $$X = Y^2/R[1+(1-(K_1+1)Y^2/R^2)^{0.5}] + K_2 Y^4 + K_3 Y^6 + K_4 Y^8 + K_5 Y^{10}$$

whereby R represents the radius of the aspherical surface and $K_1$, $K_2$, $K_3$, $K_4$, and $K_5$ are determined by said lens performance criteria.

19. A simultaneous vision contact lens having two distinct predetermined focal powers corresponding respectively to distance vision and near vision, comprising two surfaces, each one of the two surfaces having a functional portion, at least the functional portion of one of the surfaces being spherical and at least the functional portion of the other of the surfaces being aspherical, the profile of the aspherical surface characterized by a predetermined caustic curve of the wave surface emergent from the contact lens and corresponding to collimated incident light passing through the lens, said caustic curve comprising first and second nappes emerging respectively from paraxial and marginal rays, the first nappe emerging from the paraxial rays being defined by two surfaces of revolution about a main axis of the lens, one of the two surfaces of revolution being coincident with the axis and joined to a paraxial cusp, the second nappe emerging from the marginal rays being defined by two surfaces of revolution joined to a marginal cusp located on the axis.

20. A contact lens according to claim 19 wherein said cusps of said caustic curve are both directed in the same axial direction.

21. A contact lens according to claim 19 wherein the distance between said cusps of said caustic curve is directly linked to the power sum of the lens.

22. A contact lens according to claim 19 wherein the other of the two surfaces of revolution of said first nappe has a meridian which is tangential to the main axis at the paraxial cusp, the surfaces of revolution of said second nappe having meridians which have a common tangent, the common tangent being oblique to said main axis.

23. A contact lens according to claim 19 wherein the first nappe of the caustic curve is formed by a single surface the meridian of which is tangential to the axis of the caustic curve and wherein the second nappe is formed by two surfaces the meridians of which have a common tangent which is oblique to said axis.

24. A contact lens according to claim 19 wherein the paraxial cusp of the caustic curve of the wave surface which images an object situated at infinity is coincident with the marginal cusp of the caustic curve of the wave surface which images an object situated at a finite distance.

25. A contact lens according to claim 19 wherein said one of said surfaces of the lens comprises a convex front surface.

26. A contact lens according to claim 19 wherein said other of said surfaces of the lens comprises a concave rear surface.

27. A contact lens according to claim 19 wherein said functional portion of said one surface of the lens has a diameter of at least 4 mm.

28. A contact lens according to claim 19 wherein said two surfaces of the lens are both surfaces of revolution.

29. A contact lens fabricated according to a process comprising the steps of providing a lens blank having opposed surfaces, configuring at least a functional portion of one of the surfaces to an spherical configuration and the other of the surfaces to an aspherical configuration, wherein the improvement comprises determining the profile of the aspherical surface from a caustic curve of a wave surface emergent from the contact lens, said caustic curve having two cusps, one of said cusps being paraxial and the other being marginal, and the cusps of the caustic curve both being directed in the same axial direction.

30. A simultaneous vision contact lens having two distinct predetermined focal powers corresponding respectively to distance vision and near vision and fabricated according to a process comprising the steps of providing a lens blank having opposed surfaces, configuring at least a functional portion of one of the surfaces to a spherical configuration and the other of the surfaces to an aspherical configuration, determining the profile of the aspherical surface in accordance with a predetermined caustic curve of the wave surface corresponding to collimated incident light passing through the lens, said caustic curve comprising first and second nappes emerging respectively from paraxial and marginal rays, the first nappe emerging from the paraxial rays being defined by two surfaces of revolution about a main axis of the lens, one of the two surfaces of revolution being coincident with the axis and joined to a paraxial cusp, the second nappe emerging from the marginal rays being defined by two surfaces of revolution joined to a marginal cusp located on the axis.

* * * * *

UNITED STATES PATENT AND TRADEMARK OFFICE
CERTIFICATE OF CORRECTION

PATENT NO : 5,790,231
DATED : August 4, 1998
INVENTOR(S): Mercier, Jean-Louis

It is certified that error appears in the above-identified patent and that said Letters Patent is hereby corrected as shown below:

On the title page: Item [73], change the Assignee name to ESSILOR INTERNATIONAL, CIE GENERALE D'OPTIQUE Signed and Sealed this Seventeenth Day of August, 1999

Attest:

Q. TODD DICKINSON

*Attesting Officer*  *Acting Commissioner of Patents and Trademarks*